United States Patent [19]

Osowski

[11] Patent Number: 4,942,898

[45] Date of Patent: Jul. 24, 1990

[54] AUTOMATIC CULVERT DIRECTIONAL FLOW CONTROL DEVICE

[76] Inventor: Frank Osowski, R.R. #2, Box 150, Oslo, Minn. 56744

[21] Appl. No.: 368,024

[22] Filed: Jun. 19, 1989

[51] Int. Cl.⁵ .............................................. F16K 15/03
[52] U.S. Cl. ................................ 137/454.2; 137/512.1; 137/527.8; 405/124
[58] Field of Search .................... 137/512.1, 515, 527, 137/527.8, 454.2; 405/124, 125, 126

[56] References Cited

U.S. PATENT DOCUMENTS

| | | | |
|---|---|---|---|
| 231,544 | 8/1880 | Darst | 137/527.8 |
| 973,022 | 10/1910 | Fitzpatrick | 405/125 |
| 1,312,711 | 8/1919 | Vert | 137/527 |
| 1,620,089 | 3/1927 | Fischer | 405/125 |
| 1,670,520 | 5/1928 | Pekrul | 405/124 |
| 1,926,759 | 9/1933 | Wallman | 137/454.2 |
| 2,541,665 | 2/1951 | Prudhon | 137/527.8 |
| 2,854,823 | 10/1958 | Fisher | 405/125 |
| 2,877,792 | 3/1959 | Tybus | 137/512.1 |
| 3,074,427 | 1/1963 | Wheeler, Jr. | 137/512.1 |
| 3,166,093 | 1/1965 | Hopper | 137/527 |
| 3,179,164 | 4/1965 | Heller et al. | 137/527.8 |
| 3,374,804 | 3/1968 | Stegerud | 137/512.1 |
| 3,533,438 | 10/1970 | Smith | 137/512.1 |
| 3,831,628 | 8/1974 | Kintner | 137/527 |
| 4,257,444 | 3/1981 | Ogle, Jr. et al. | 137/515 |

*Primary Examiner*—Stephen M. Hepperle
*Assistant Examiner*—Leonard R. Leo
*Attorney, Agent, or Firm*—Vidas & Arrett

[57] ABSTRACT

An automatic culvert directional flow control device comprising a flange or support ring supporting a hinge assembly. A pair of dampers are joined to the hinge in a pivoting and a vertical relationship, one over the other. The dampers are held in a normally closed position by means such as a counter balance. The culvert directional flow control device is designed for easy installation on the inside of existing culverts and acts to prevent water from reversing direction of flow through the culvert against the desired normal flow.

9 Claims, 4 Drawing Sheets

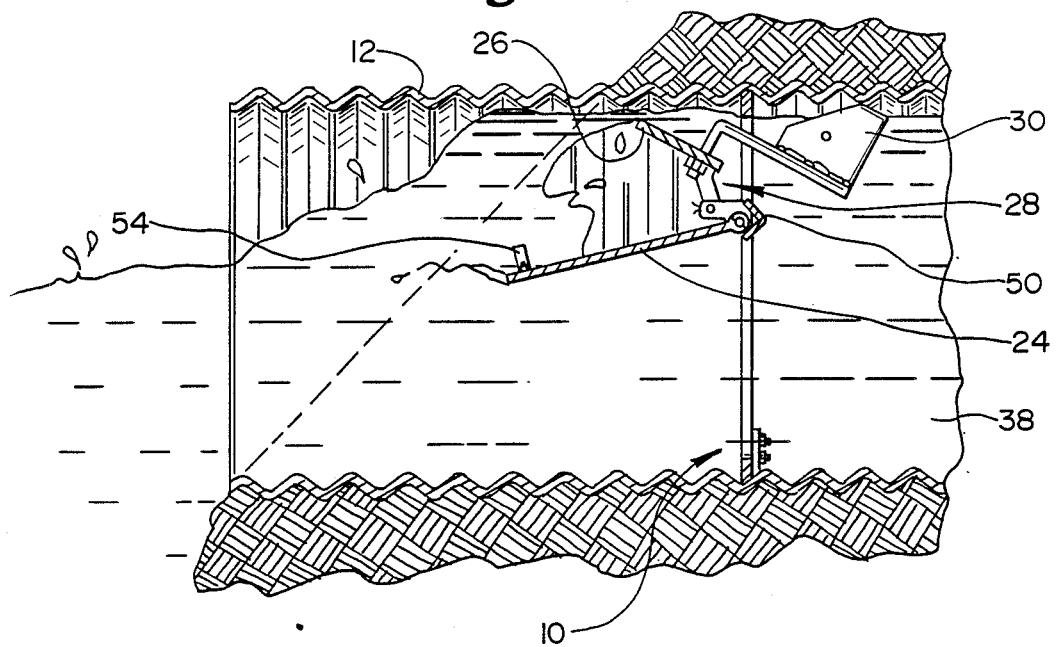
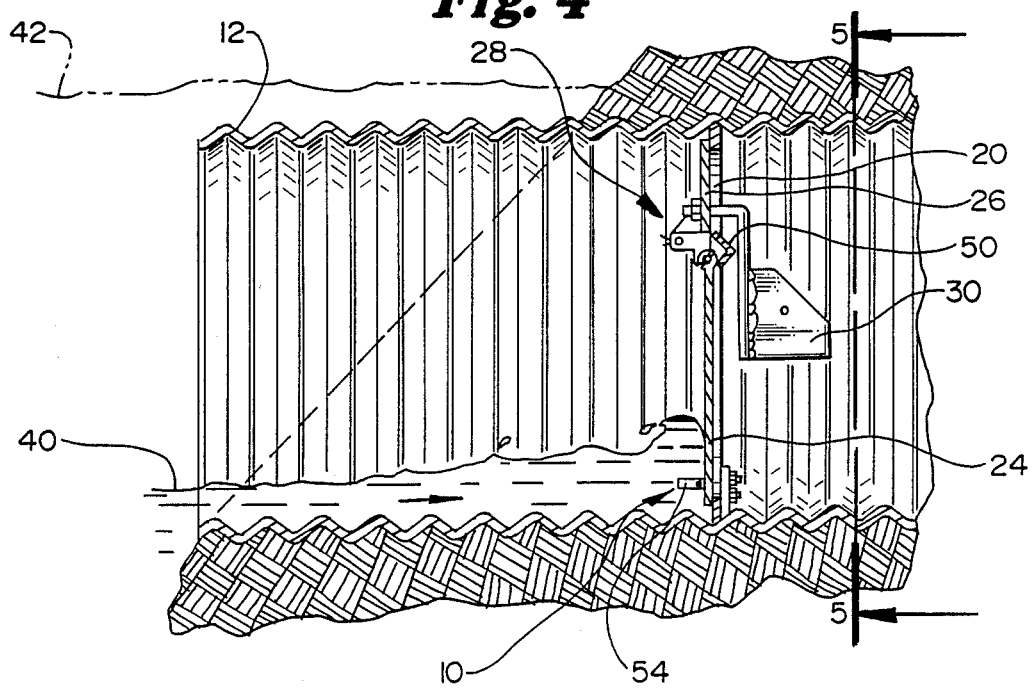

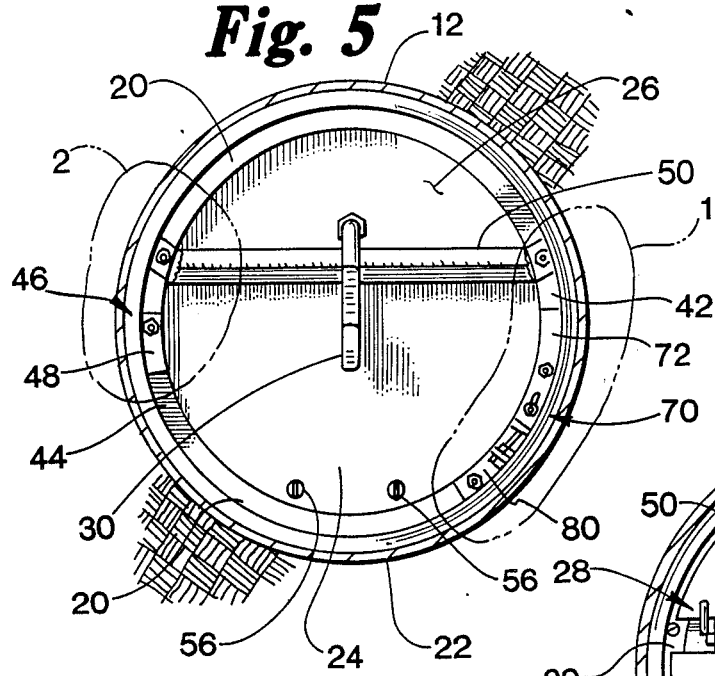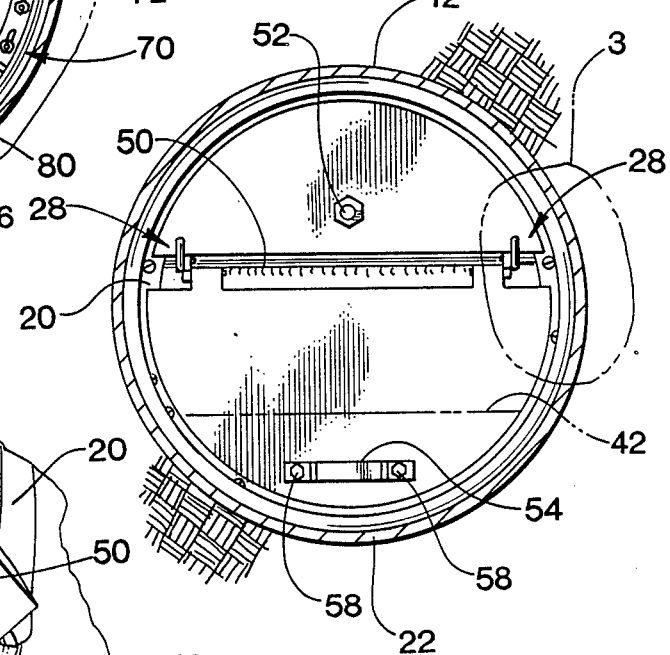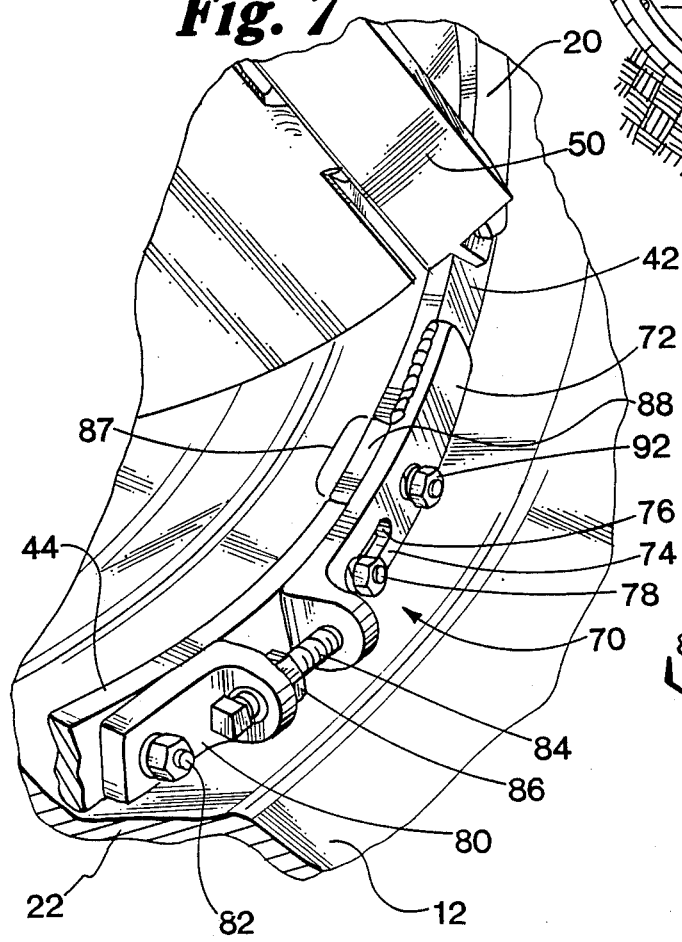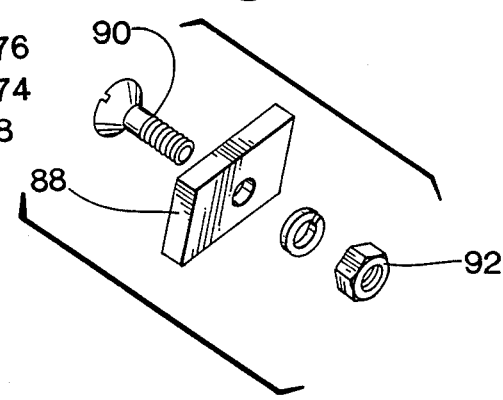

4,942,898

AUTOMATIC CULVERT DIRECTIONAL FLOW CONTROL DEVICE

BACKGROUND OF THE INVENTION

1. Field of the Invention

This invention relates to culvert directional flow control devices, and more particularly to an automatic culvert directional flow control device designed to prevent water from backing up against the normal desired flow of water through a drainage system.

2. Description of the related art

The art described in this section is not intended to constitute an admission that any patent, publication or other information referred to herein is "prior art", or should be considered relevant for this invention, unless specifically designated as such. In addition, this section should not be construed to mean that a search has been made or that no other pertinent information as defined in 37 C.F.R. §1.56(a) exists.

U.S. Pat. No. 2,541,665 issued to C. Prudhon and titled "Automatic Fan Damper" is directed to an electric fan with damper blades which are open by the air pressure and closed by gravity. The damper blades are carried on pivot rods which are slightly off vertical to allow the weight of the damper blades to act to close them.

U.S. Pat. No. 2,877,792 issued to F. Tybus and titled "Surge or Back Flow Valve" is directed to a valve designed for a vertical pipe with the flow of liquid going in an upward direction. The segments 23 and 24 are elevated into a position which allows water to flow through by the pressure of the water. When the pressure drops, gravity allows the segments to fall back into a horizontal position which retards the flow of water back down the pipe.

U.S. Pat. No. 3,166,093 issued to A. Hopper and titled "Check Valve" is directed to a support designed to carry very heavy check valves. The wing members pivot around the support member to allow fluid to flow in one direction and to prevent the flow of fluid in the opposite direction.

U.S. Pat. No. 3,179,164 issued to L. Heller et al and titled "Anti-icing Arrangements for Heat Exchangers of Air Condensing Apparatus" is directed to a valve with curved flaps which open downwardly with water pressure, and has counterweights to bias the flaps in the closed position. The valve is designed for vertical pipes.

U.S. Pat. No. 3,374,804 issued to O. Stegerud and titled "Check Valves" is directed to a valve for use in horizontal pipes. The valve flaps are mounted with its seating surface directed obliquely upwards so that the weight of the flaps is made effective in the direction of closure. The flaps are mounted in a side by side fashion.

U.S. Pat. No. 3,533,438 issued to S. Smith and titled "Island Check Valve" is directed to a check valve with spring biased vanes. The pressure of the water opens the vanes, and the springs close the vanes when the pressure drops enough.

U.S. Pat. No. 3,831,628 issued to E. Kintner and titled "Check Valve" is directed to a check valve using a rubber diaphragm. When the water pressure is great enough it will flex the diaphragm and the diaphragm halves will open. The resiliency and tendency of the rubber diaphragm to close will cause the diaphragm to close when the pressure drops below a predetermined fluid flow.

SUMMARY OF THE INVENTION

Applicant lives in the Red River Valley region of Minnesota. This area is very flat, and rises as little as one foot per mile. Most of the trees and brush has been cleared from this area for farming purposes. This lack of cover causes all the snow to melt at one time in the spring. Practically the entire region melts and drains into the river in a very short space of time. This can cause the river to become a lake 16 miles wide. Also, if there are extensive rains downstream the level of the river will rise upstream. These two conditions cause the water to back up into the drainage system, flooding the farmlands.

Applicant has been working on developing a culvert trap or directional flow device which would allow the water to drain off the farmland, but prevent the water from backing up from the river. Applicant has developed the current device through trial and error, is currently (Spring of 1989) testing this device.

None of the valves discussed above could readily be adapted to work as an automatic culvert directional flow control device. Several of the patents described above are designed to work in a vertical pipe and are therefore unsuitable as directional flow control devices for a horizontal culvert. The valves discussed above that are intended for use in a horizontal pipe have their valve flaps opening sideways rather than having the two valve flaps open upwardly and downwardly as applicants invention does. Applicant has discovered through trial and error that supporting a pair of dampers in pivotal relationship from a horizontal support member allows one or both of the dampers to be forced open by the flow of water when the pressure of flow reaches a predetermined level. Obviously, the flow of water varies considerably during any one year and also is markedly different in wet versus dry years. A predetermined head of water will slightly open the lower damper to drain, while a large head of water, perhaps caused by a flood, will force open both dampers, thereby allowing a greater amount of water to flow through the culvert in the intended direction. When the head falls below a predetermined amount, a counter balance will act to close the upper damper while gravity closes the lower damper, preventing water from reversing flow through the culvert. The dampers are mounted such that water flowing in the wrong direction will actually close the dampers, preventing the water from flooding the culvert.

The automatic culvert directional flow control device is designed to be easy to assemble, and may be readily installed into existing culverts. A support ring or flange is made from two semicircular pieces at least one of which provides support for the hinge mechanism. The support ring can be adjusted to fit various sized culverts. The ring is designed to fit into the grooves of a corrugated metal culvert, which aids in holding the directional flow control device secure. The flow control device is designed to be installed on the inside of a culvert and therefore will work with any culvert whether it has an apron attached to it or not.

BRIEF DESCRIPTION OF THE DRAWINGS

FIG. 3 is similar to FIG. 2, but showing a high volume of water passing through the culvert device;

FIG. 4 is similar to FIG. 2 but showing the culvert device closed by reverse flow of water;

FIG. 5 is a sectional elevation taken along line 5—5 in FIG. 4;

FIG. 6 is a view similar to FIG. 5, but showing the opposite side of the culvert device;

FIG. 7 is a fragmentary perspective detail view of the expansion clamp portions taken from the area encircled at 1 in FIG. 5;

FIG. 7a is an exploded detail view of the expansion clamp key;

DESCRIPTION OF THE PREFERRED EMBODIMENTS

Figure 1:
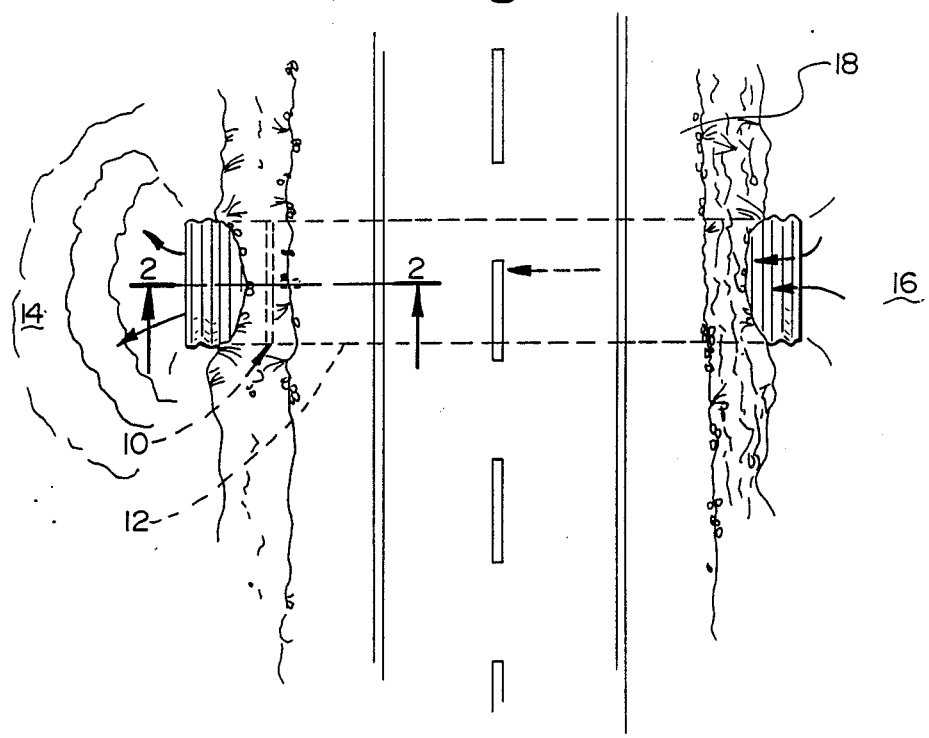
FIG. 1 is a top plan view of a roadway and culvert with water passing from one side of the roadway to the other.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, the culvert direction flow control device, hereafter referred to as culvert device, is shown generally in silhouette at 10 as installed in a representative culvert 12 connecting areas of water 14 and 16 on either side of a road 18. The culvert device could be installed in any existing culvert, the arrangement shown and described being only a representative example of one such arrangement.

Figure 2:
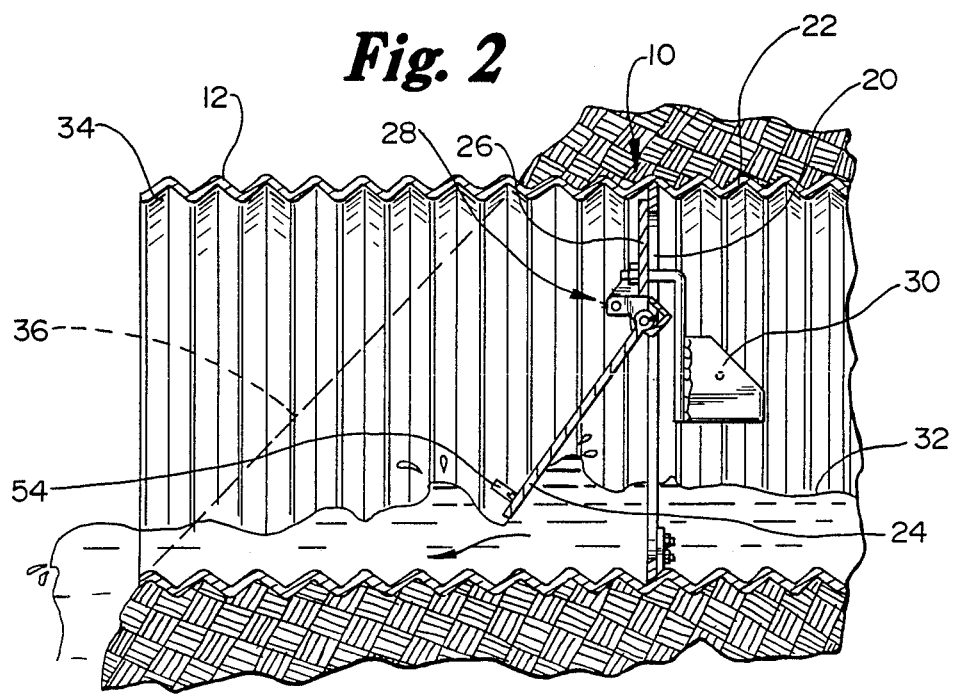
FIG. 2 is an enlarged fragmentary sectional elevation taken along line 2—2 of FIG. 1 showing a moderate volume of water passing through the culvert device.

Referring now to FIG. 2, a side view of the culvert device, shown generally at 10, is shown. Culvert 12 is a conventional galvanized metal type having grooves 34 spaced equidistant from each other and extending around the perimeter of the culvert. The culvert device consists generally of three pieces: a ring 20 which is sized to fit into a groove 22 in the culvert 12; a lower damper 24, and an upper damper 26, both shown connected to hinge assembly shown generally at 28. A counter balance 30 is attached to upper damper 26. A small volume of water 32 is shown flowing through the culvert device 10, forcing the lower damper 24 open. The culvert device 10 may be installed in any culvert because it can be installed into any groove in culvert 12. If the culvert does not have an apron the culvert device may be installed closer to the end of the culvert, such as in groove 34. Dotted line 36 shows that portion of the culvert 12 which would be cut away to provide an apron (not shown). If an apron is present, the culvert device is simply installed further inside the culvert 12 as shown in FIG. 2.

Referring now to FIG. 3, a high volume of water 38 is shown passing through the culvert device 10. This high volume of water forces both the lower damper 24 open, as well as the upper damper 26. When the volume of water lessens counter balance 30 well close the upper damper 26 returning it to its normally closed position. Gravity will cause the lower damper to return to its normally closed position.

Referring now to FIG. 4, a low flood level is shown by water level 40 which helps force the lower damper 24 closed, thereby preventing the water from flooding the rest of the drainage system. A high flood level is shown by the water level 42. During high flooding conditions the entire culvert will be filled with water, helping to force the upper and lower dampers 26 and 24 closed, thereby preventing this flood water from gaining access to the rest of the drainage system.

Figure 8:
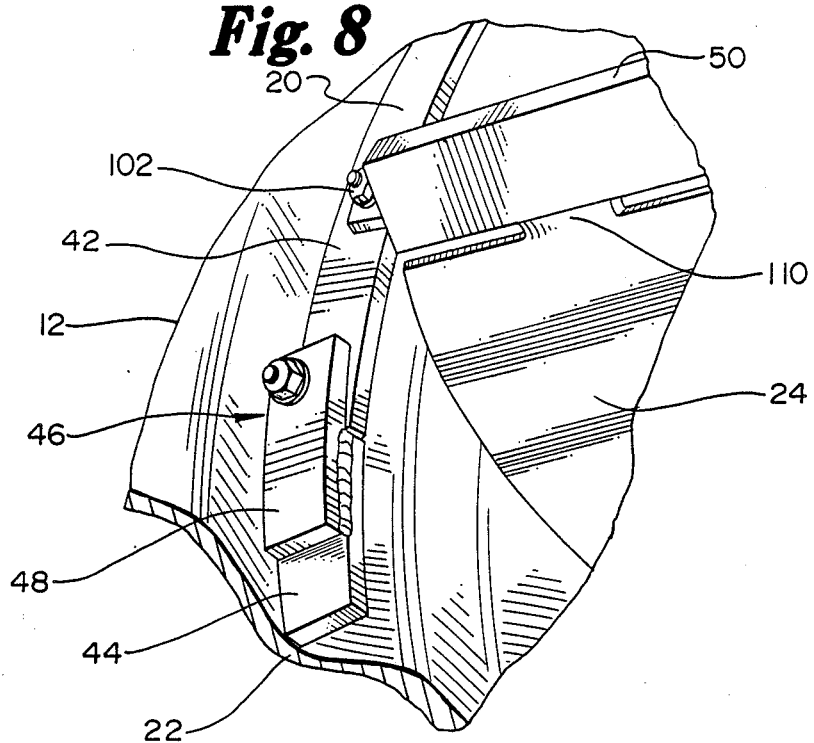
FIG. 8 is a fragmentary perspective detail view of the expansion clamp hinge taken from the area encircled at 2 in FIG. 5.

Referring now to FIG. 5, a face on view of the rear of the culvert device is shown. Ring 20 is made up of two roughly semicircular pieces 42 and 44 attached at one end as shown generally as 46 and at the other end as shown in FIG. 7, as will be further explained below. Ring 20 is made out of steel that has been galvanized for corrosion resistance, but could be made out of any material that is strong enough to support the dampers when water is flowing. In the preferred embodiment piece 48 is welded to semicircular ring portion 44 and bolted to semicircular ring portion 42, shown best in FIG. 8. Of course the ring could be formed of one piece, or the two semicircular sections could be welded directly together. The two dampers 24 and 26 are attached to angled beam 50 via hinge assembly 28 as described more fully with reference to FIG. 6 and 9, but could also be attached by other common means such as rivets or welding.

Referring now to FIG. 6, the opposite side of the culvert device is shown. The end of counter balance 30 is threaded and is secured to the upper damper 26 with nut 52. Handle 54 is attached with bolts 56 (shown in FIG. 5) and nuts 58.

Referring now to FIGS. 7 and 7a, ring 20 is made up of two semicircular pieces 42 and 44 as discussed above. The ends of 42 and 44 are joined together with spreader assembly shown generally at 70. The spreader assembly 70 allows the ring to be collapsed to allow the culvert device 10 to be installed into a groove 22 in a culvert. Once the culvert device 10 is in place, the spreader assembly is used to expand the diameter of the ring 20 to firmly anchor the culvert device in place. The spreader assembly 70 is comprised of a spreader bracket 72 which is welded or attached to ring portion 42. End 74 of bracket 72 has slot 74 provided to allow the spreader bracket to be attached to ring portion 44 via nut and bolt 78. A second spreader bracket 80 is bolted to ring portion 44 with nut and bolt 82, although it could be welded in place. Brackets 72 and 80 are connected by spreader screw 84. Spreader nut 86 is used to force the two brackets further apart, thereby expanding the diameter of the ring 20. In use, spreader nut 86 is positioned near bracket 72, and nut and bolt 78 are loosened, allowing the ring portions to collapse slightly to allow installation into groove 22. Spreader nut 86 is then used to force the ring to fit snugly into groove 22. Once ring 20 is expanded to the desired diameter nut and bolt 78 is tightened. The ends of ring portions 42 and 44 may have a slight gap 87 between them once ring 20 is installed. This gap is filled with key 88 which is sized to fit gap 87 and secured there with bolt 90 and nut 92. It should be understood that the preferred embodiment is designed for ease of experimentation in variously sized culverts, and the commercial embodiment, although not yet designed, may use other standard techniques to connect the two ring portions 42 and 44 while still allowing them to be spread apart and collapsed to allow installation.

Figure 9:
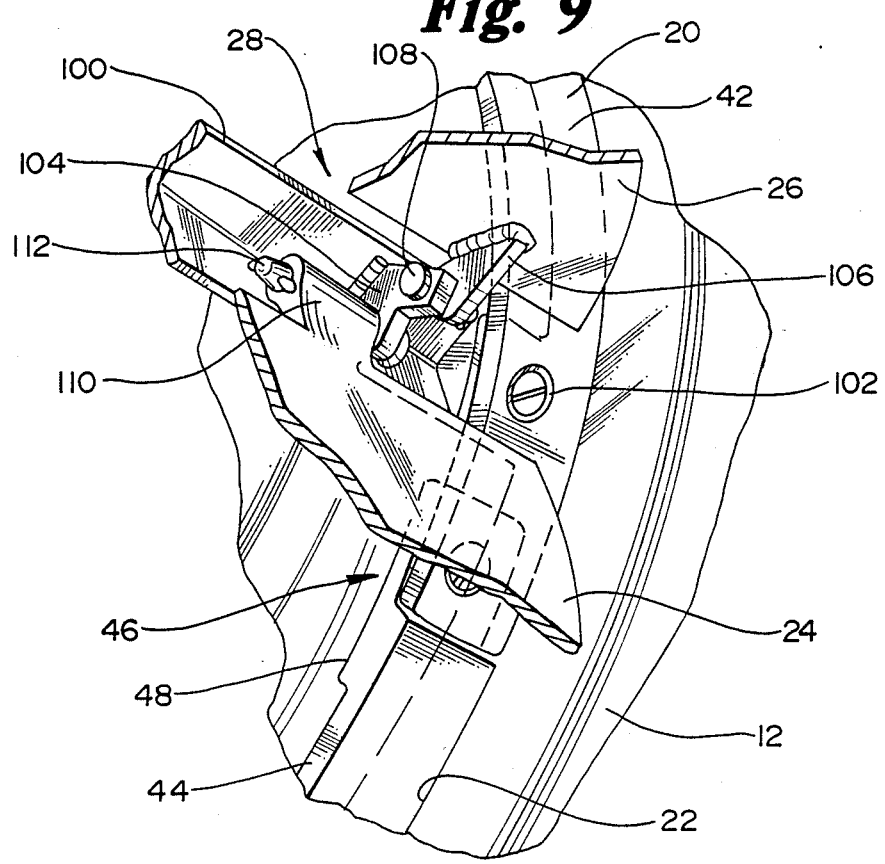
FIG. 9 is a fragmentary perspective detail view of the area encircled at 3 in FIG. 6.

Referring now to FIGS. 6 and 9, the hinge assembly shown generally at 28 is shown encircled at area 3 in FIG. 6. FIG. 9 is a perspective view of area 3. Hinge assembly 28 is comprised of angled beam 100 which is attached to ring portion 42 parallel to the ground and above the center diameter of ring 20. Beam 100 is attached to ring portion 42 with bolts 102, although the beam could be welded in place or attached by other methods. A pair of divider hinges 104 are welded to the upper portion of the beam 100 near the ends. The upper damper 26 is provided with a pair of upper damper hinges 106 which are welded in place. A pair of cotter pins 108 secures the upper damper to divider hinge 104. The lower damper 24 is provided with a pair of lower damper hinges 110 which are secured to divider hinge 104 with a pair of cotter pins 112.

This completes the description of the preferred and alternate embodiments of the invention. Those skilled in the art may recognize other equivalents to the specific embodiment described herein which equivalents are intended to be encompassed by the claims attached hereto.

What is claimed is:

1. An automatic culvert directional flow control device designed to prevent the back flow of water comprising:
    a support member defining a width and height opening, wherein the support member is an arcuate shaped flange sized to tightly fit entirely inside a groove on an inside perimeter of a culvert having a plurality of grooves;
    hinge means attached substantially horizontally across the opening of the support;
    normally closed upper and lower dampers pivotally attached to the hinge means, the dampers being in a vertical orientation when in their normally closed position,
    counter balance means attached to the upper damper,
    whereby a first predetermined pressure of water bearing against the lower damper will open that damper allowing water to pass through, and where gravity closes said lower damper when the water pressure falls below said first predetermined pressure, and where a second higher predetermined pressure of water bearing against both dampers will open both dampers, said second damper being opened against the weight of the counter balance means to allow additional water to pass through, where said counter balance means closes said upper damper when the water pressure falls below said second predetermined pressure.

2. The automatic culvert directional flow control device of claim 1 wherein the flange is made up of two semicircular pieces, wherein said semicircular pieces are attached to the hinge means with the hinge means horizontal to the ground, whereby said semicircular pieces are in a vertical position one above the other.

3. The automatic culvert directional flow control device of claim 1 where said culvert has an inside surface, and has grooves extending the entire circumference of the inside surface, and where the flange is constructed and arranged such that it fits in-between two of the grooves.

4. The automatic culvert directional flow control device of claim 3 further including adjustment means attached to said flange whereby the diameter of said flange may be adjusted to more accurately fit the circumference of the culvert.

5. The automatic culvert directional flow control device of claim 4 wherein the hinge means further comprises:
    a support member attached horizontally across the flange;
    a pair of damper support members attached at either end of the support member;
    a pair of upper damper attachment members attached to either side of the upper damper and arranged for attachment to the damper support members;
    a pair of lower damper attachment members attached to either side of the lower damper and arranged for attachment to the damper support members;
    means for pivotally attaching the upper damper attachment members to the damper support members, and
    means for pivotally attaching the lower damper attachment members to the damper support members.

6. An automatic culvert directional flow control device designed to prevent the back flow of water in a culvert comprising:
    a generally arcuate supporting member sized to tightly fit at least a portion of an inside diameter of a culvert, the culvert having an inside surface, and sized to fit inside a groove on the inside surface of the culvert;
    hinge means attached horizontally across the arc of said supporting means;
    normally closed upper and lower semicircularly shaped dampers pivotally attached to said hinge means and being in a vertical relationship one over the other when normally closed;
    a counter balance attached to the upper damper,
    whereby a first predetermined pressure of water bearing against the lower damper will open that damper allowing water to pass through, and where gravity closes said lower damper when the water pressure falls below said first predetermined pressure, and where a second higher predetermined pressure of water bearing against both dampers will open both dampers, said second damper being opened against the weight of the counter balance means to allow additional water to pass through, where said counter balance means close said upper damper when the water pressure falls below said second predetermined pressure.

7. The automatic culvert directional flow control device of claim 6 wherein the arcuate support member is a flange sized to tightly fit the entire inside circumference of a culvert.

8. The automatic culvert directional flow control device of claim 7 further including adjustment means attached to said flange whereby the diameter of said flange may be adjusted to more accurately fit the inside circumference of the culvert.

9. The automatic culvert directional flow control device of claim 8 wherein the hinge means further comprises:
    a support member attached horizontally across the flange;
    a pair of damper support members attached at either end of the support member;
    a pair of upper damper attachment members attached to either side of the upper damper and arranged for attachment to the damper support members;

a pair of lower damper attachment members attached to either side of the lower damper and arranged for attachment to the damper support members;

means for pivotally attaching the upper damper attachment members to the damper support members, and means for pivotally attaching the lower damper attachment members to the damper support members.

* * * * *